US012546449B2

(12) United States Patent
Kwon et al.

(10) Patent No.: US 12,546,449 B2
(45) Date of Patent: Feb. 10, 2026

(54) OPTICAL DEVICE, METHOD OF MANUFACTURING THE SAME, AND VEHICLE INCLUDING THE OPTICAL DEVICE

(71) Applicant: HYUNDAI MOBIS CO., LTD., Seoul (KR)

(72) Inventors: Eun Bi Kwon, Yongin-si (KR); Seok Ho Jeong, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/829,849

(22) Filed: Sep. 10, 2024

(65) Prior Publication Data

US 2026/0016134 A1 Jan. 15, 2026

(30) Foreign Application Priority Data

Jul. 10, 2024 (KR) ........................ 10-2024-0091054

(51) Int. Cl.

| | |
|---|---|
| ***F21S 41/151*** | (2018.01) |
| ***F21S 41/24*** | (2018.01) |
| ***F21S 41/43*** | (2018.01) |
| ***F21S 43/14*** | (2018.01) |
| ***F21S 43/236*** | (2018.01) |
| ***F21S 43/245*** | (2018.01) |
| ***F21S 43/249*** | (2018.01) |

(Continued)

(52) U.S. Cl.

CPC ............. *F21S 41/151* (2018.01); *F21S 41/24* (2018.01); *F21S 41/43* (2018.01); *F21S 43/14* (2018.01); *F21S 43/236* (2018.01); *F21S 43/245* (2018.01); *F21S 43/249* (2018.01); *F21S 2243/00* (2024.05); *F21Y 2103/10* (2016.08); *F21Y 2115/10* (2016.08)

(58) Field of Classification Search

CPC .......... F21S 41/151; F21S 41/24; F21S 41/43; F21S 43/249; F21S 43/14; F21S 43/245; F21S 43/236

See application file for complete search history.

(56) References Cited

U.S. PATENT DOCUMENTS

| | | | | |
|---|---|---|---|---|
| 2017/0227183 A1* | 8/2017 | Cho | .................. | F21S 43/28135 |
| 2022/0355731 A1* | 11/2022 | Rhee | ....................... | B32B 9/025 |

(Continued)

FOREIGN PATENT DOCUMENTS

| | | | |
|---|---|---|---|
| EP | 3 211 290 | A1 | 8/2017 |
| KR | 10-2016-0081131 | A | 7/2016 |
| WO | WO 2017/178703 | A1 | 10/2017 |

OTHER PUBLICATIONS

Extended European Search Report Issued on Mar. 3, 2025, in Counterpart European Patent Application No. 24204119.2 (10 Pages in English).

*Primary Examiner* — Christopher E Dunay
(74) *Attorney, Agent, or Firm* — NSIP Law

(57) ABSTRACT

An optical device, a method of manufacturing same, and a vehicle therefor are provided. The optical device includes a printed circuit board (PCB); light emitting diodes (LEDs) spaced apart from each other on the PCB, a light guide layer with the LEDs embedded therein, and a pattern layer stacked on a side surface of the light guide layer to implement a three-dimensional luminescent image using light from the LEDs. The LEDs include at least top-emitting LEDs and/or side-emitting LEDs.

11 Claims, 9 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 2022/0390088 | A1* | 12/2022 | Eom | H10H 20/8515 |
| 2023/0120518 | A1* | 4/2023 | Lim | G02B 6/0073<br>362/84 |
| 2023/0135095 | A1* | 5/2023 | Choi | F21S 43/195<br>362/459 |
| 2025/0004325 | A1* | 1/2025 | Lim | F21S 43/40 |

* cited by examiner

OPTICAL DEVICE, METHOD OF MANUFACTURING THE SAME, AND VEHICLE INCLUDING THE OPTICAL DEVICE

CROSS-REFERENCE TO RELATED APPLICATION(S)

This application claims the benefit under 35 USC § 119 of Korean Patent Application No. 10-2024-0091054, filed on Jul. 10, 2024, in the Korean Intellectual Property Office, the entire disclosures of which is hereby incorporated by reference for all purposes.

BACKGROUND

1. Field

The disclosure relates to an optical device. In particular, the disclosure relates to an optical device for implementing a three-dimensional (3D) luminescent image through top-emitting and side-emitting light emitting diodes (LEDs) in a lamp structure of a vehicle, a method of manufacturing the same, and a vehicle including the optical device.

2. Description of the Related Art

In general, a vehicle is equipped with various lamps that emit light forward depending on an ambient environment and time of day to secure a driver's vision and inform other vehicles of its traveling path.

These lamps are categorized according to the purposes of use, such as a turn signal for securing the driver's vision and indicating the position of the vehicle, together with a headlamp for illuminating ahead of the vehicle, a fog lamp for securing the driver's vision and indicating the position of the vehicle in a foggy or rainy condition, together with the headlamp, a reverse light for lighting up when the vehicle is in reverse, and a brake light for lighting up when the driver applies the brakes.

Halogen bulbs are mainly used for conventional vehicle lamps. When a halogen lamp is used as a light source, there is a reflector that reflects light irradiated by the halogen lamp, and the reflected light is irradiated forward. However, while halogen lamps have the advantage of being inexpensive, they have the disadvantages of high heat generation during use, low brightness relative to the amount of electricity used, and short lifespans.

To solve these problems, vehicle lamps using light emitting diodes (LEDs) have emerged. LED lamps have the advantages of high brightness, long lifespans, and low power consumption.

As described above, to realize various functions of vehicle lamps, a plurality of LEDs are arranged to irradiate light, and in general, various shapes of luminous images are formed through three-dimensional structures such as light guides.

However, discoloration and deformation of a light guide may occur due to the continuous operation of the vehicle, which may cause problems in terms of repair and maintenance. Moreover, as the number of components increases, there is a disadvantage in terms of cost.

Therefore, there is a need for a means for realizing various shapes of luminous images while solving the above-mentioned problems.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Accordingly, the disclosure is directed to an optical device, a method of manufacturing the same, and a vehicle including the optical device that substantially obviate one or more problems due to limitations and disadvantages of the related art.

In a general aspect of the disclosure, an optical device includes: a printed circuit board (PCB); a plurality of light emitting diodes (LEDs) configured to be spaced apart from each other on the PCB; a light guide layer with the plurality of LEDs embedded therein; and a pattern layer stacked on a side surface of the light guide layer and configured to implement a three-dimensional luminescent image using light from the plurality of LEDs, wherein the plurality of LEDs include at least one of one or more top-emitting LEDs, one or more side-emitting LEDs, or a combination thereof.

The three-dimensional luminescent image may be implemented by at least one of light irradiated through a top surface of the light guide layer, light irradiated through the pattern layer, or a combination thereof.

The light guide layer may include a first optical resin configured to diffuse the light from the plurality of LEDs, wherein the pattern layer may include a pattern hole configured to expose the light guide layer.

The pattern layer may include a second optical resin shielding the light from the plurality of LEDs.

The second optical resin may include at least one of a black color, non-black color, or a combination thereof.

A refractive index of the first optical resin and a refractive index of the second optical resin may be the same.

A refractive index of the first optical resin and a refractive index of the second optical resin may be different from each other.

The pattern hole formed in the pattern layer may include a polygonal shape.

A plurality of pattern holes may be formed in a grid shape.

The light guide layer may be formed to a predetermined thickness.

In another general aspect of the disclosure, a method of manufacturing an optical device, includes: stacking, on a printed circuit board (PCB), a light guide layer in which a plurality of light emitting diodes (LEDs) are embedded while being spaced apart from each other; positioning a pattern member on a side surface of the light guide layer; stacking a pattern layer on the light guide layer; and forming a pattern hole in the pattern layer by removing the pattern member from the side surface of the light guide layer.

The stacking the pattern layer on the light guide layer may include stacking the pattern layer on a side surface and a top surface of the light guide layer, wherein the method further comprises removing the pattern layer stacked on the top surface of the light guide layer.

The positioning of the pattern member on the side surface of the light guide layer may include arranging a plurality of pattern members in a grid shape.

The pattern hole may be pre-formed on the pattern layer prior to the pattern layer being stacked on the light guide layer.

In yet another general aspect of the disclosure, a vehicle includes: a vehicle body; a lamp structure positioned on at least one of a front surface of the vehicle body, a rear surface of the vehicle body, or a combination thereof; and an optical device embedded in the lamp structure, wherein the optical device includes: a printed circuit board (PCB); a plurality of light emitting diodes (LEDs) configured to be spaced apart from each other on the PCB; a light guide layer with the plurality of LEDs embedded therein; and a pattern layer stacked on a side surface of the light guide layer and configured to implement a three-dimensional luminescent image using light from the plurality of LEDs, wherein the plurality of LEDs include at least one of one or more top-emitting LEDS, one or more side-emitting LEDs, or a combination thereof.

The pattern layer may include a pattern hole on a side of the light guide layer through which light from the plurality of LEDs passes.

The effects that are achievable by the disclosure are not limited to what has been particularly described hereinabove and other advantages not described herein will be more clearly understood by persons skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
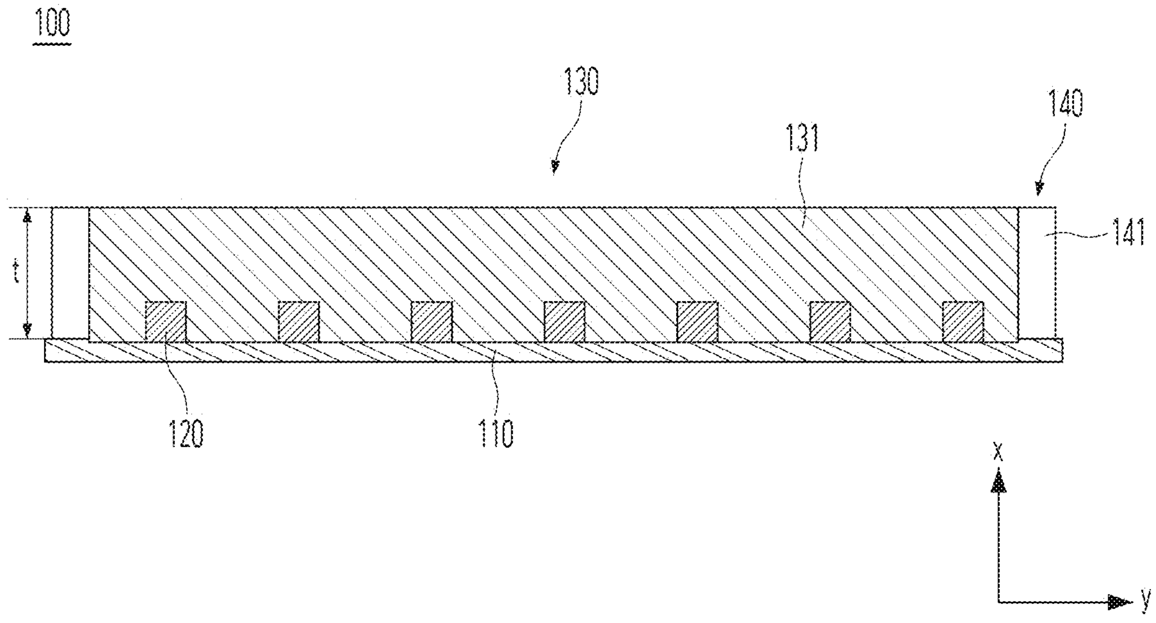
FIG. 1 is a diagram illustrating an optical device according to an embodiment of the disclosure.
Figure 2:
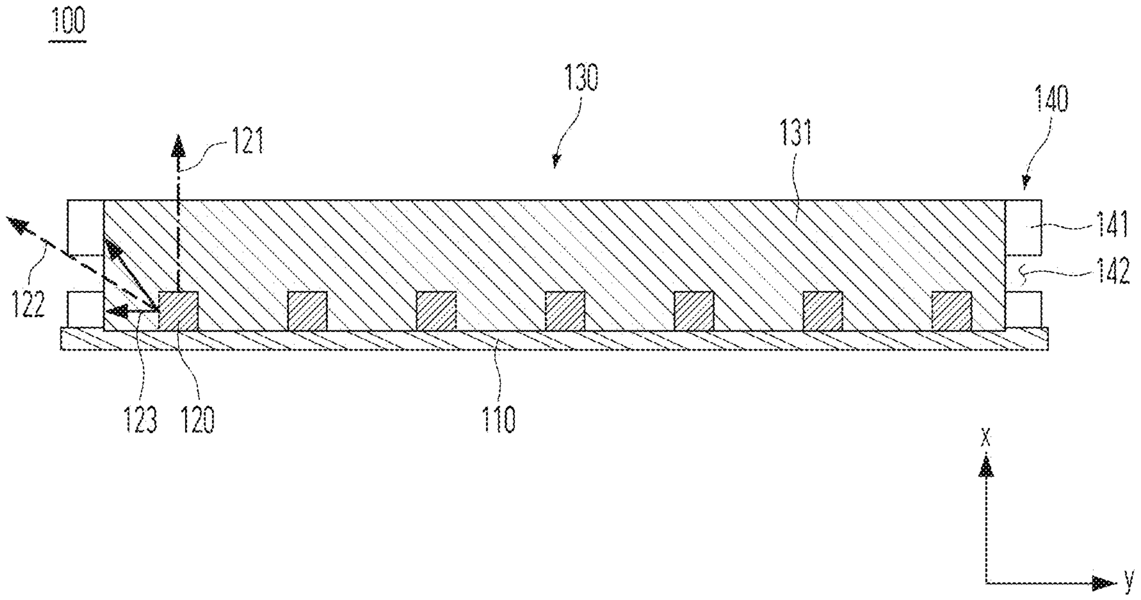
FIG. 2 is a diagram illustrating a feature of implementing a three-dimensional luminescent image through a pattern layer in an optical device according to an embodiment of the disclosure.

FIG. 1 is a diagram illustrating an optical device 100 according to an embodiment of disclosure. FIG. 2 is a diagram illustrating a feature of implementing a three-dimensional luminescent image through a pattern layer 140 in the optical device 100 according to an embodiment of disclosure. In addition, FIGS. 3 to 8 are diagrams illustrating a process of forming a pattern hole 142 in the pattern layer 140 in the optical device 100 according to an embodiment of disclosure.

Referring to FIGS. 1 and 2 together, the optical device 100 according to an embodiment of disclosure may include a printed circuit board (PCB) 110, a plurality of light emitting diodes (LEDs) 120, a light guide layer 130, and the pattern layer 140. The optical device 100 according to an embodiment of disclosure may be embedded in a lamp structure located on at least one of a front or rear surface of a vehicle body in a vehicle.

More specifically, the plurality of LEDs 120 may be arranged spaced apart from each other on the PCB 110 and serve to output light. Particularly, the plurality of LEDs 120 may include top-emitting and side-emitting LEDs 120 in the optical device 100 according to an embodiment of disclosure.

Therefore, in the optical device 100 according to an embodiment of disclosure, the plurality of LEDs 120 may output light in a forward or backward direction (x-axis direction), a left-right direction (y-axis direction), and an up-down direction (z-axis direction) of the vehicle body, thereby serving to implement a three-dimensional luminescent image to be described later.

The light guide layer 130 may be stacked on the PCB 110 so that the plurality of LEDs 120 are embedded in the light guide layer 130. The light guide layer 130 may include a first optical resin 131 for diffusing light from the plurality of LEDs 120. Further, the first optical resin 131 may include a transparent color to enhance the light diffusion effect.

The pattern layer 140 may be stacked on a side surface of the light guide layer 130 and serve to implement a three-dimensional luminescent image using light from the plurality of LEDs 120. The pattern layer 140 may include a second optical resin 141 that shields the light from the plurality of LEDs 120. Further, the second optical resin 141 may include at least one of black color, a non-black color, or a combination thereof.

Particularly, the optical device 100 according to an embodiment of disclosure may implement a three-dimensional luminescent image through the pattern layer 140 stacked on the side surface of the light guide layer 130. The three-dimensional luminescent image may be implemented by light 121 irradiated through a top surface of the light guide layer 130 and light 122 and 123 irradiated through the pattern layer 140.

More specifically, the optical device 100 according to an embodiment of disclosure may include the plurality of LEDs 120 including top-emitting and side-emitting LEDs 120 and the pattern layer 140 stacked on the side surface of the light guide layer 130 to implement a three-dimensional luminescent image.

This may enable implementation of a three-dimensional luminescent image by using a difference between an image by the light 121 irradiated through the top surface of the light guide layer 130 and an image by the light 122 and 123 irradiated through the pattern layer 140.

Traditionally, various shapes of images have been implemented through three-dimensional structures such as light guides, as described above. However, since discoloration and shape deformation of a light guide may occur due to the continuous operation of a vehicle, problems often occur in terms of repair and maintenance. Moreover, as the number of components increases, there is a disadvantage in terms of cost. Accordingly, there is a need to reduce the number of necessary components.

In this context, the optical device 100 according to an embodiment of disclosure is intended to address the above-described problem by implementing a three-dimensional luminescent image while obviating the need for a three-dimensional structure such as a conventional light guide.

For this purpose, the difference between the image by the light 121 irradiated through the top surface of the light guide layer 130 and the image by the light 122 and 123 irradiated through the pattern layer 140 may be used, as described above.

Particularly, the pattern layer 140 may include a pattern hole 142 formed to expose the light guide layer 130 in the optical device 100 according to an embodiment of disclosure. A three-dimensional luminescent image may be implemented by the light 122 irradiated through the pattern hole 142, without a three-dimensional structure such as a light guide.

That is, the optical device 100 according to an embodiment of disclosure may implement a three-dimensional luminescent image by using the difference between the image by the light 121 irradiated through the top surface of the light guide layer 130 and the image by the light 122 and 123 irradiated through the pattern layer 140, thereby obviating the need for a three-dimensional structure such as a light guide. Accordingly, the optical device 100 may be advantageous in terms of repair, maintenance, and cost, compared to the conventional device.

Further, the pattern hole 142 formed in the pattern layer 140 may include a polygonal shape in the optical device 100 according to an embodiment of disclosure. A plurality of pattern holes 142 may be formed in a grid shape. This enables implementation of various shapes of three-dimensional luminescent images.

In addition, the light guide layer 130 may be formed to a predetermined thickness t in order to form the pattern holes 142 in the pattern layer 140 stacked on the side surface of the light guide layer 130 in the optical device 100 according to an embodiment of disclosure.

For example, the light guide layer 130 may be formed to a thickness of 8 mm or more. The pattern holes 142 may be formed in the pattern layer 140 stacked on the side surface of the light guide layer 130 by forming the light guide layer 130 to a sufficient thickness. In addition, a three-dimensional luminescent image may be implemented by the light 122 irradiated through the pattern holes 142.

Further, the pattern layer 140 in the optical device 100 according to an embodiment of disclosure may include the second optical resin 141 that shields light from the plurality of LEDs 120, as described above. That is, as illustrated in FIG. 2, the light 122 and 123 emitted from side surfaces of the plurality of LEDs 120 may include the light 122 irradiated through the pattern holes 142 and the light 123 shielded by the pattern layer 140. This may enable implementation of various shapes of three-dimensional luminescent images.

Further, in the optical device 100 according to an embodiment of disclosure, the second optical resin 141 may include at least one of black or a color, which may enable implementation of three-dimensional luminescent images of various colors.

In addition, in the optical device 100 according to an embodiment of disclosure, refractive indexes of the first optical resin 131 and the second optical resin 141 may be the same. Further, the refractive indexes of the first optical resin 131 and the second optical resin 141 may be different from each other. This may enable implementation of more diverse shapes of three-dimensional luminescent images by adjusting the degree of diffusion of the light 123 emitted from the side surfaces of the plurality of LEDs 120 and irradiated through the pattern layer 140.

FIGS. 3 to 8 are diagrams illustrating a process of forming the pattern holes 142 in the pattern layer 140 in the optical device 100 according to an embodiment of disclosure.

Figure 3:
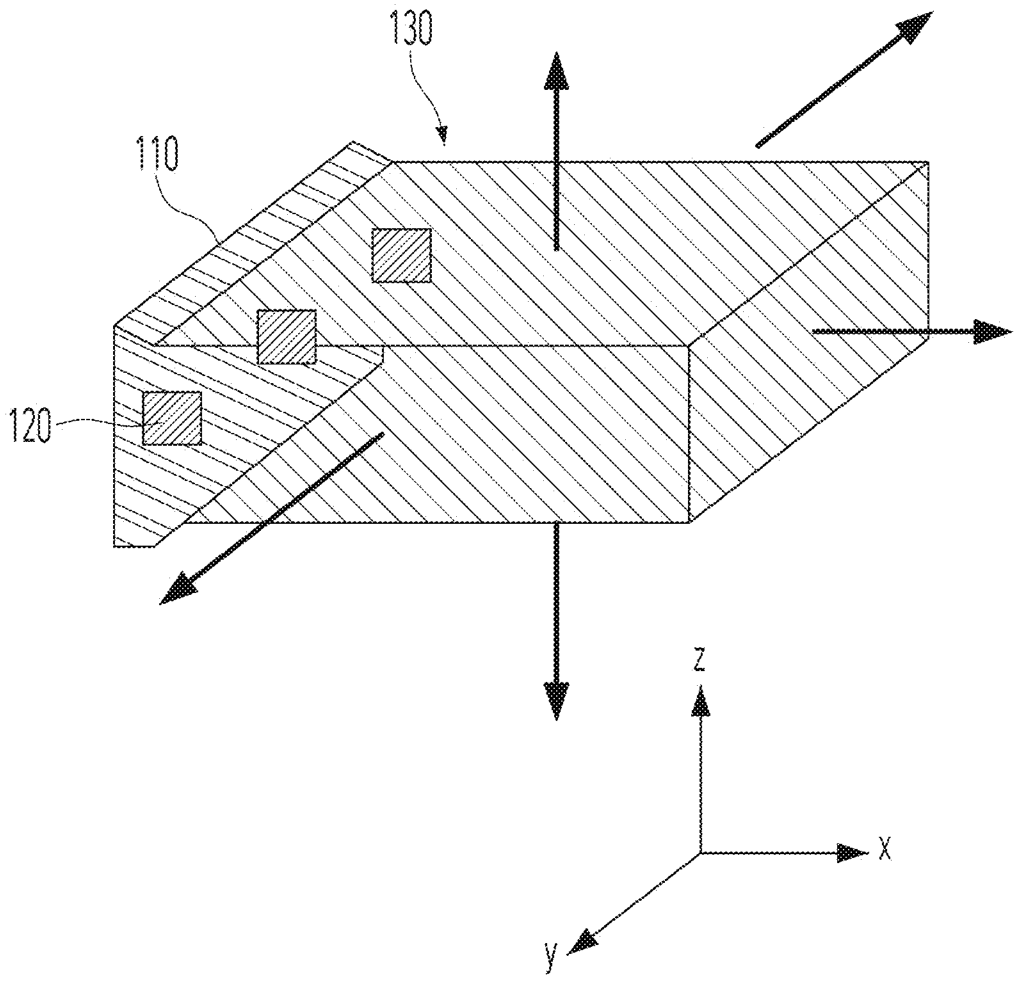
FIGS. 3 to 8 are diagrams illustrating a process of forming pattern holes in a pattern layer in an optical device according to an embodiment of the disclosure.

FIG. 3 is a diagram referred to for describing that light may be output in the forward or backward direction (x-axis direction), left-right direction (y-axis direction), and up-down direction (z-axis direction) of the vehicle body through the top-emitting and side-emitting LEDs 120 and the light guide layer 130 staked on the PCB 110, as described above.

Figure 4:
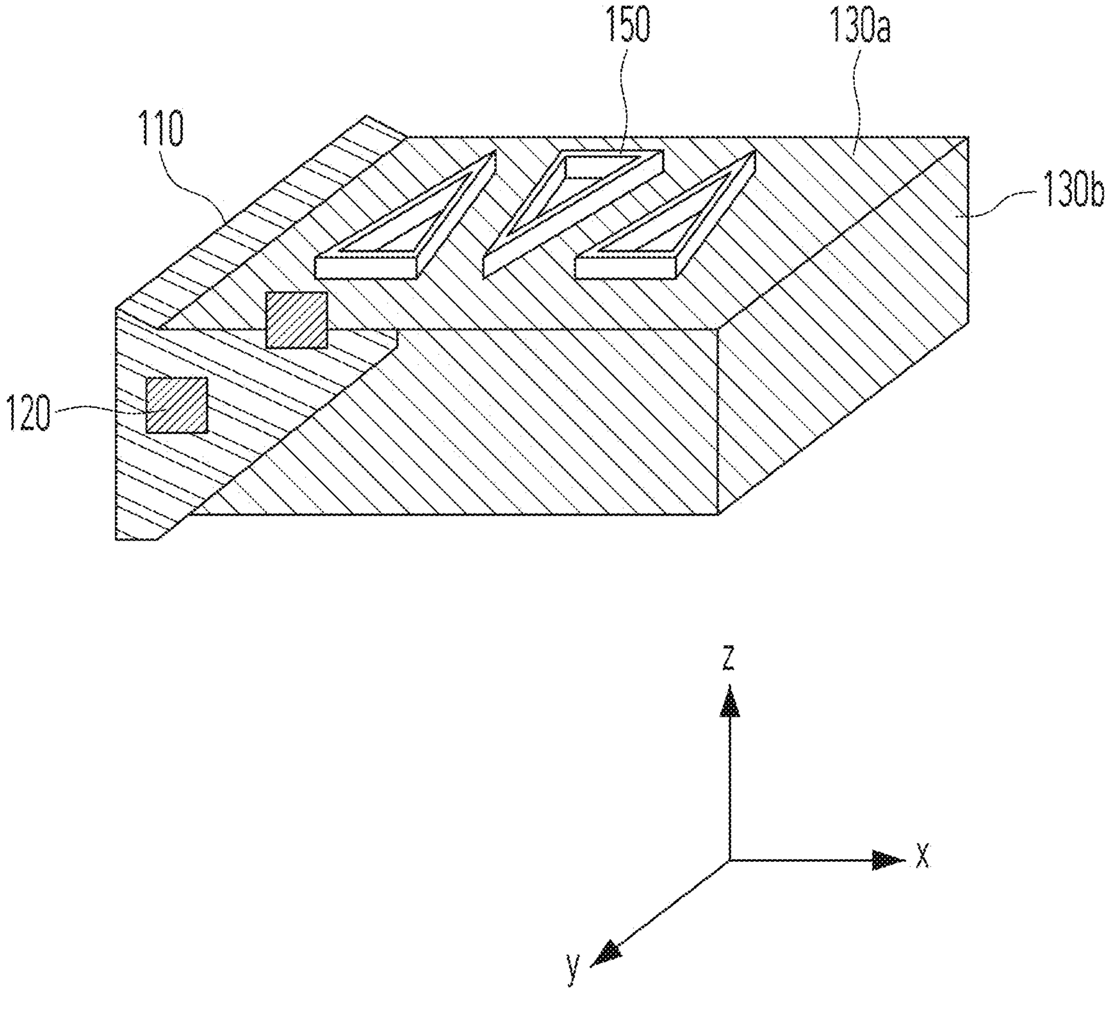

In the optical device 100 according to an embodiment of disclosure, a pattern member 150 may be positioned on a side surface 130*a* of the light guide layer 130, as illustrated in FIG. 4. The pattern member 150 may include a polygonal shape. In addition, a plurality of pattern members 150 may be arranged in a grid shape and positioned on the side surface 130*a* of the light guide layer 130. The shape and arrangement of the pattern members 150 illustrated in FIG. 4 are only an example, and shapes and arrangements other than those illustrated in FIG. 4 may also be available.

Figure 5:
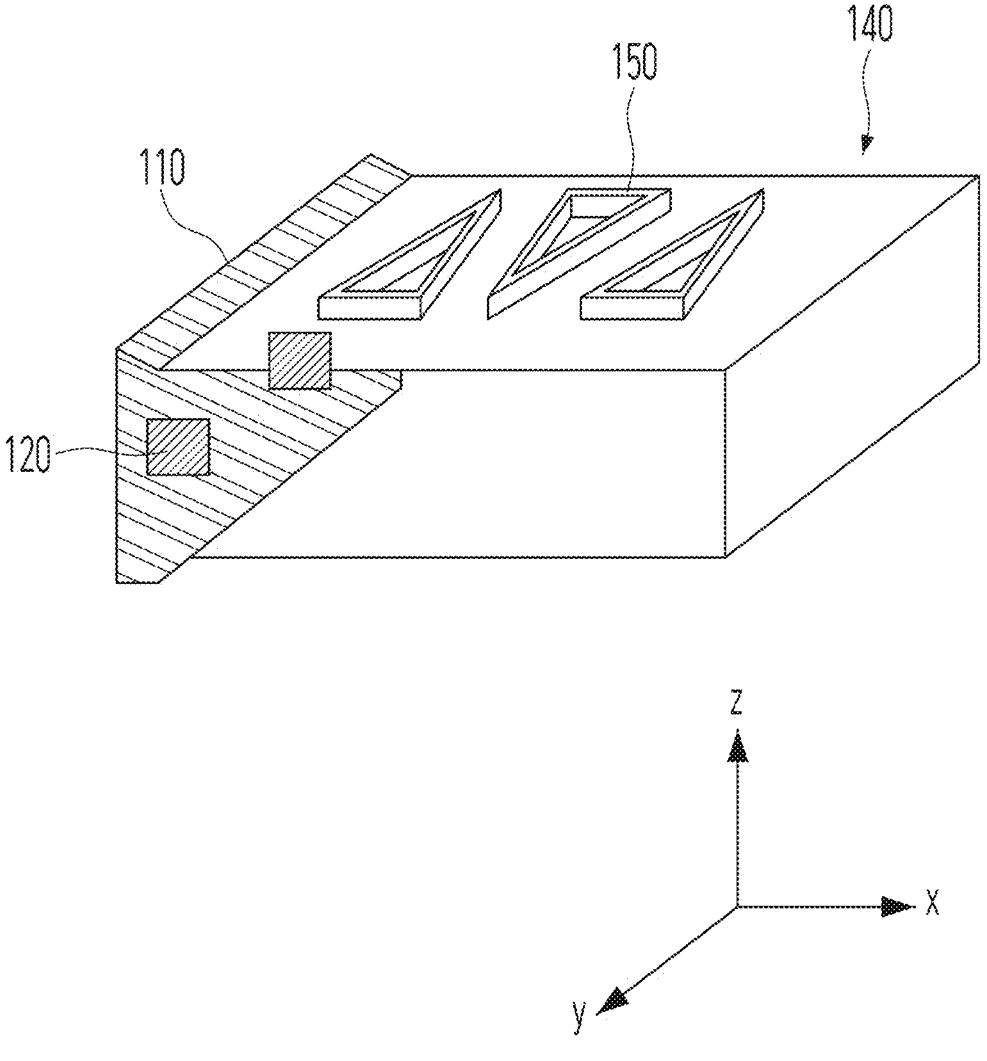

With the pattern members 150 positioned on the side surface 130*a* of the light guide layer 130, the pattern layer 140 may be stacked on the light guide layer 130 in the optical device 100 according to an embodiment of disclosure, as illustrated in FIG. 5. Although the pattern layer 140 may be stacked only on the side surface 130*a* of the light guide layer 130, the pattern layer 140 may also be stacked simultaneously on the side surface 130*a* and a top surface 130*b* of the light guide layer 130, for the convenience of the manufacturing process.

Figure 6:
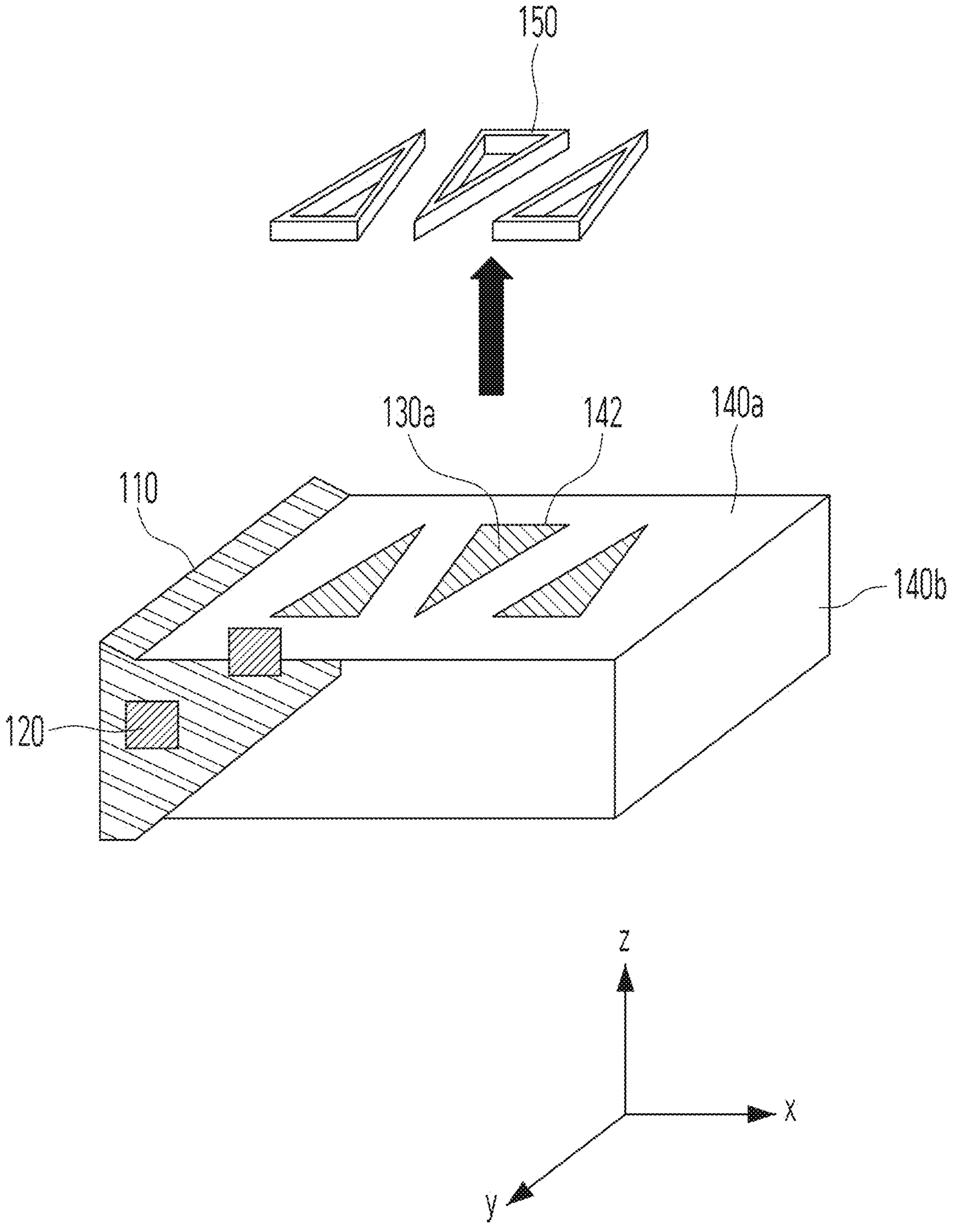

With the pattern layer 140 stacked on the light guide layer 130, the pattern members 150 may be removed from the side surface 130*a* of the light guide layer 130 in the optical device 100 according to an embodiment of disclosure, as illustrated in FIG. 6. The pattern holes 142 may then be formed in the pattern layer 140 by removing the pattern members 150. As an example, the pattern layer 140 may be applied on the side surface 130*a* (except for the area covered by the pattern members 150), e.g., the pattern layer may have an adhesive surface that adheres to the side surface 130*a*. In another embodiment, the pattern layer 140 may have pre-formed cutouts that may correspond to the dimensions of the pattern members 150, and the pattern layer 140 is secured to or attached to the side surface 130*a*.

Therefore, in the optical device 100 according to an embodiment of disclosure, the pattern holes 142 may be formed in the pattern layer 140 to correspond to the shape and arrangement of the pattern members 150 described above. In addition, the light guide layer 130 may be exposed through the pattern holes 142.

Figure 7:
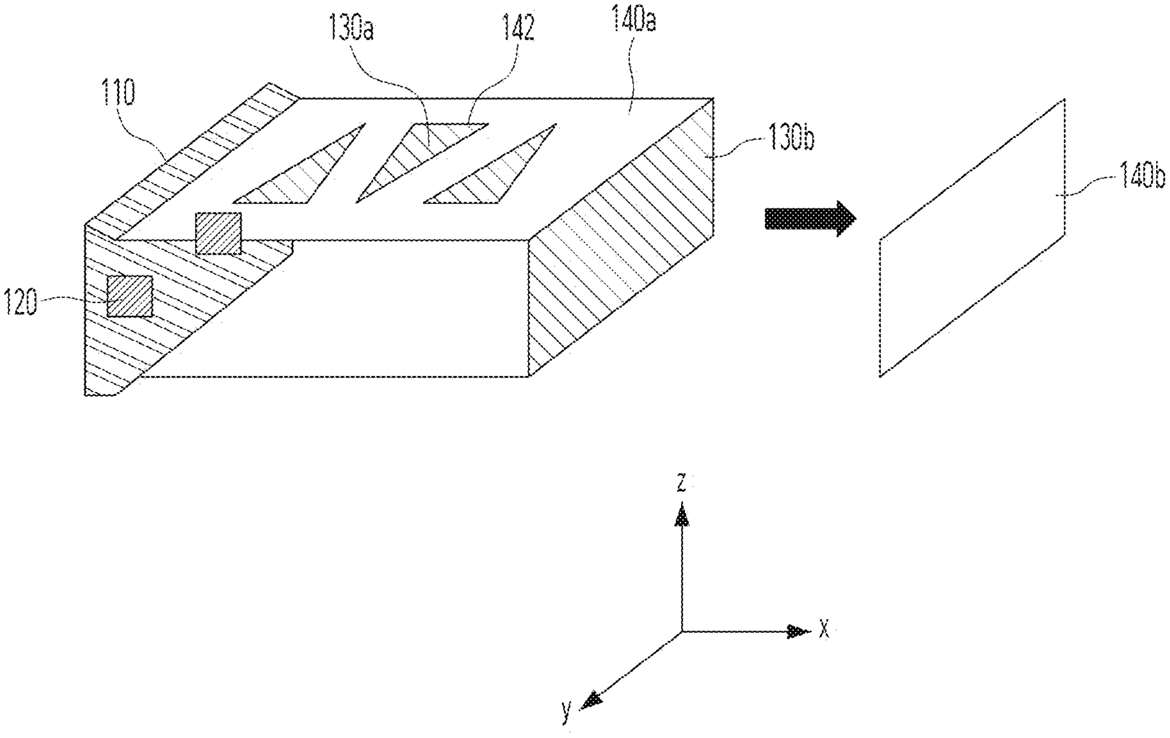

The pattern layer 140 may also be stacked on the top surface 130*b* of the light guide layer 130 in the optical device 100 according to an embodiment of disclosure, for the convenience of the manufacturing process as described above, and in this case, the pattern layer 140*b* stacked on the top surface 130*b* of the light guide layer 130 may be removed, as illustrated FIG. 7.

Therefore, the top surface 130*b* of the light guide layer 130 may be exposed by removing the pattern layer 140*b* stacked on the top surface 130*b* of the light guide layer 130 in the optical device 100 according to an embodiment of disclosure.

Figure 8:
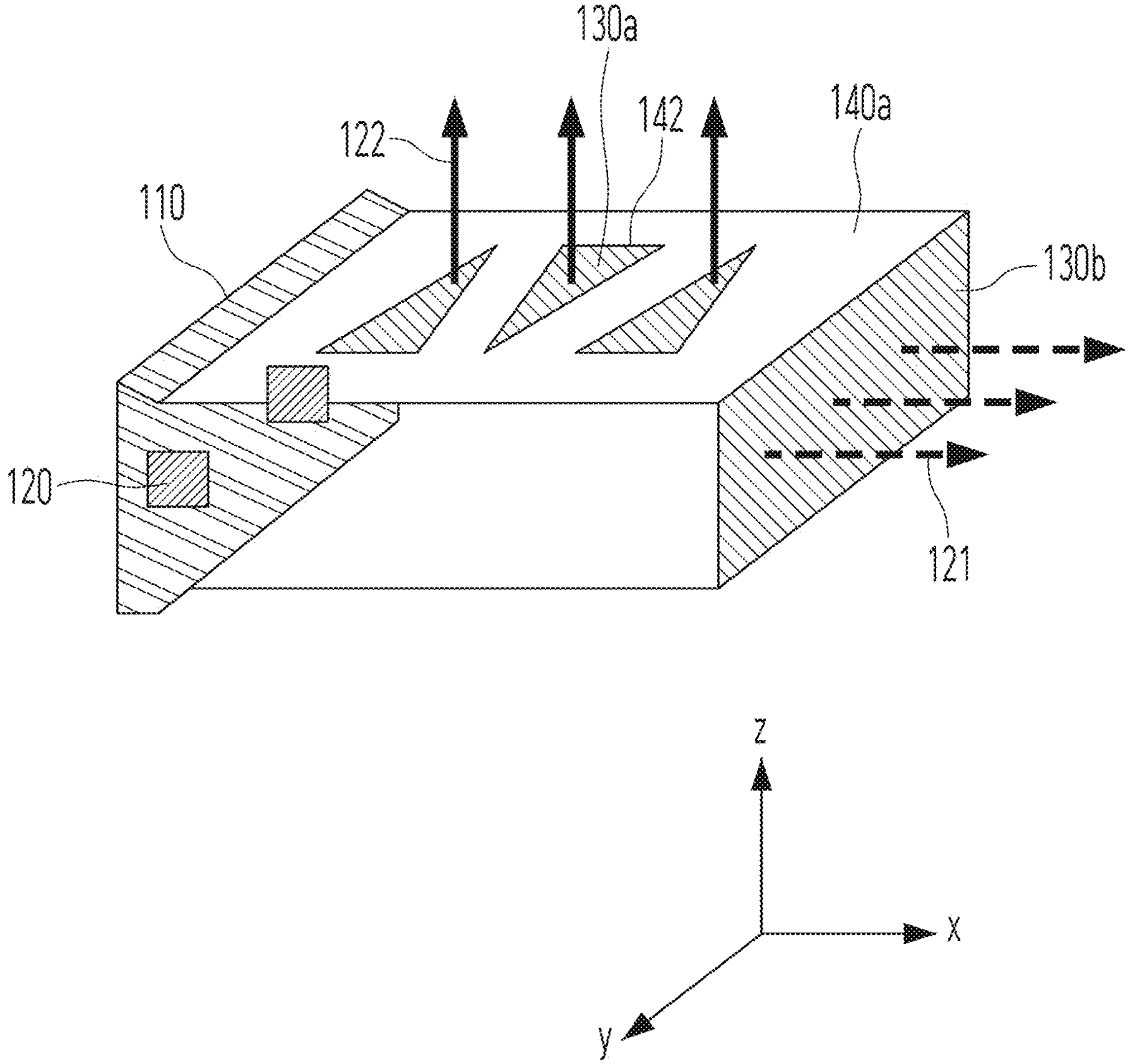

The optical device 100 according to an embodiment of disclosure may implement a three-dimensional luminescent image by using the pattern layer 140*a* stacked on the side surface 130*a* of the light guide layer 130 to block light from the plurality of LEDs 120, the light 122 irradiated through the side surface 130*a* of the light guide layer 130 exposed by the pattern holes 142, and the light 121 irradiated through the top surface 130*b* of the light guide layer 130, as illustrated in FIG. 8.

Figure 9:
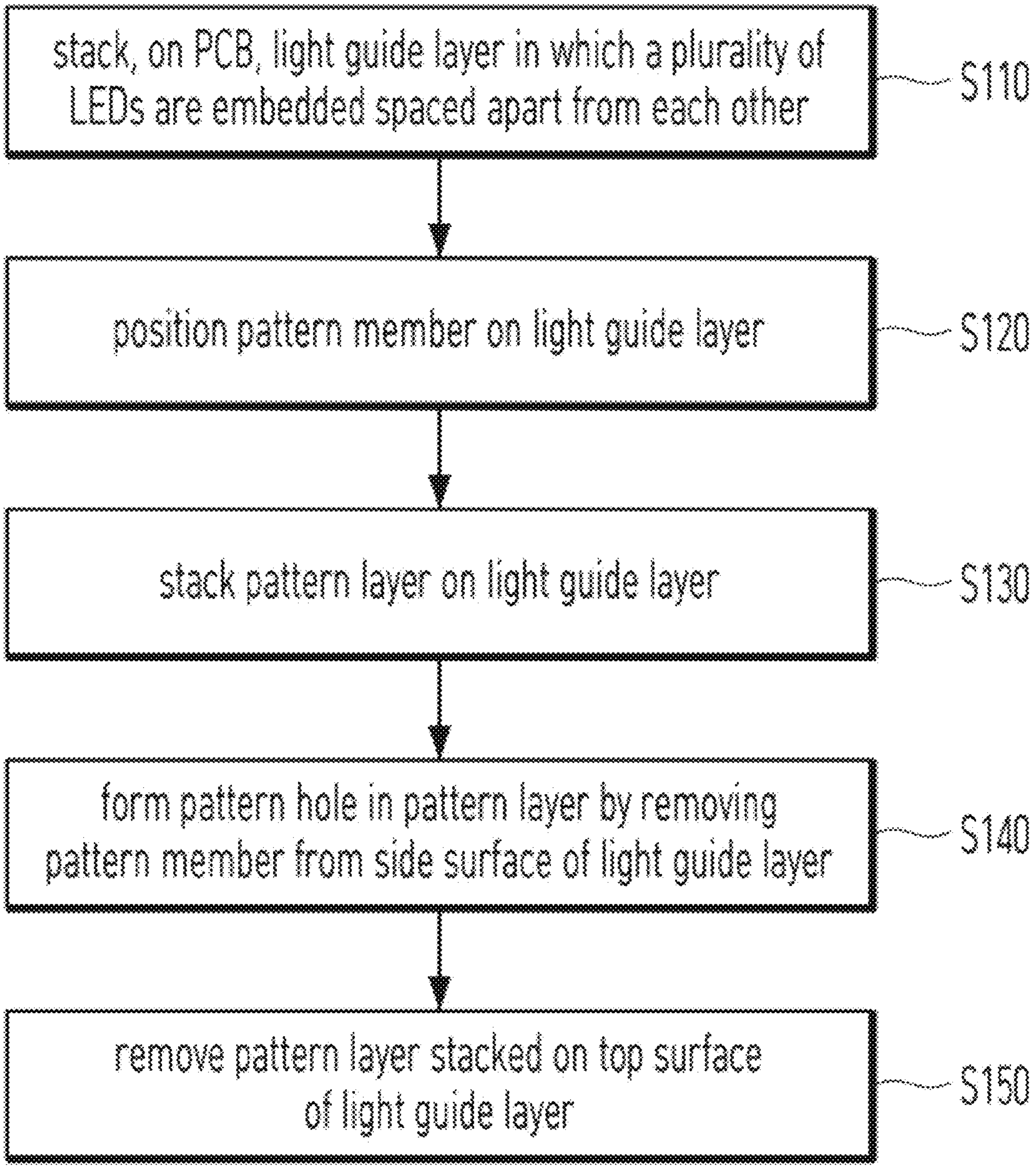
FIG. 9 is a diagram illustrating a method of manufacturing an optical device according to an embodiment of the disclosure.

FIG. 9 is a diagram illustrating a method of manufacturing an optical device according to an embodiment of disclosure.

The method of manufacturing an optical device according to an embodiment of disclosure will be described below in consideration of the description given with reference to FIGS. 1 to 8.

In the method for manufacturing an optical device according to an embodiment of disclosure, the light guide layer 130 in which the plurality of LEDs 120 are embedded spaced apart from each other may first be stacked on the PCB 110 (S110). The plurality of LEDs 120 may include the top-emitting and side-emitting LEDs 120, as described above. Further, the light guide layer 130 may serve to diffuse light from the plurality of LEDs 120.

The pattern members 150 may be positioned on the side surface of the light guide layer 130 (S120). The pattern layer 140 may then be stacked on the light guide layer 130 (S130). Although the pattern layer 140 may be stacked only on the side surface 130*a* of the light guide layer 130, the pattern layer 140 may also be stacked simultaneously on the side surface 130*a* and the top surface 130*b* of the light guide layer 130, for the convenience of the manufacturing process.

The pattern holes 142 may be formed in the pattern layer 140 by removing the pattern members 150 from the side surface 130*a* of the light guide layer 130 (S140). The light guide layer 130 may be exposed through the pattern holes 142. Subsequently, the pattern layer 140*b* stacked on the top surface 130*b* of the light guide layer 130 may be removed (S150). This may expose the top surface 130*b* of the light guide layer 130. Alternatively, the pattern layer 140 may have pre-formed cutouts that may correspond to the dimensions of the pattern members 150, and the pattern layer may be secured to or attached to the side surface 130*a*.

The optical device 100 according to an embodiment of disclosure may be manufactured through the above-described process. As described above with reference to FIGS. 1 to 8, various shapes of three-dimensional luminescent images may be implemented by the light 121 irradiated through the top surface of the light guide layer 130 and the light 122 and 123 irradiated through the pattern layer 140.

In summary, the optical device, the method of manufacturing the same, and the vehicle including the optical device according to disclosure may implement a three-dimensional luminescent image through the top-emitting and side-emitting LEDs in the lamp structure of the vehicle. In addition, the three-dimensional luminescent image may be implemented by light irradiated through the top surface of the light guide layer and light irradiated through the pattern layer stacked on the side surface of the light guide layer, without the need for a separate guide member. Further, various shapes of three-dimensional luminescent images may be implemented through the pattern holes formed on the pattern layer.

The above detailed description is to be construed in all aspects as illustrative and not restrictive. The scope of the disclosure should be determined by reasonable interpretation of the appended claims and all changes coming within the equivalency range of the disclosure are intended to be embraced in the scope of the disclosure.

What is claimed is:

1. An optical device comprising:
- a printed circuit board (PCB);
- a plurality of light emitting diodes (LEDs) configured to be spaced apart from each other on the PCB;
- a light guide layer with the plurality of LEDs embedded therein; and
- a pattern layer stacked on a side surface of the light guide layer and configured to implement a three-dimensional luminescent image using light from the plurality of LEDs,
- wherein the plurality of LEDs include at least one of one or more top-emitting LEDs, one or more side-emitting LEDs, or a combination thereof,
- wherein the pattern layer includes a first optical resin shielding the light from the plurality of LEDs.

2. The optical device of claim 1, wherein the three-dimensional luminescent image is implemented by at least one of light irradiated through a top surface of the light guide layer, light irradiated through the pattern layer, or a combination thereof.

3. The optical device of claim 1, wherein the light guide layer further includes a second optical resin configured to diffuse the light from the plurality of LEDs, and wherein the pattern layer includes a pattern hole configured to expose the light guide layer.

4. The optical device of claim 3, wherein a refractive index of the second optical resin and a refractive index of the second optical resin are the same.

5. The optical device of claim 3, wherein a refractive index of the second optical resin and a refractive index of the second optical resin are different from each other.

6. The optical device of claim 3, wherein the pattern hole formed in the pattern layer includes a polygonal shape.

7. The optical device of claim 6, wherein a plurality of pattern holes are formed in a grid shape.

8. The optical device of claim 1, wherein the second optical resin includes at least one of a black color, non-black color, or a combination thereof.

9. The optical device of claim 1, wherein the light guide layer is formed to a predetermined thickness.

10. A vehicle comprising:
- a vehicle body;

a lamp structure positioned on at least one of a front surface of the vehicle body, a rear surface of the vehicle body, or a combination thereof; and an optical device embedded in the lamp structure, wherein the optical device includes:

a printed circuit board (PCB);

a plurality of light emitting diodes (LEDs) configured to be spaced apart from each other on the PCB;

a light guide layer with the plurality of LEDs embedded therein; and a pattern layer stacked on a side surface of the light guide layer and configured to implement a three-dimensional luminescent image using light from the plurality of LEDs, wherein the plurality of LEDs include at least one of one or more top-emitting LEDS, one or more side-emitting LEDs, or a combination thereof, and wherein the pattern layer includes an optical resin shielding the light from the plurality of LEDs.

11. The vehicle of claim 10, wherein the pattern layer includes a pattern hole on a side of the light guide layer through which light from the plurality of LEDs passes.

* * * * *